May 27, 1969     B. E. SHLESINGER, JR     3,445,930
ONE PIECE PLUGBOARD PLUG CONNECTOR
Original Filed July 26, 1965     Sheet 1 of 5
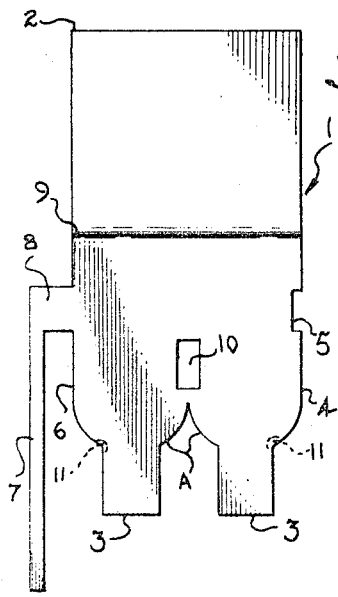
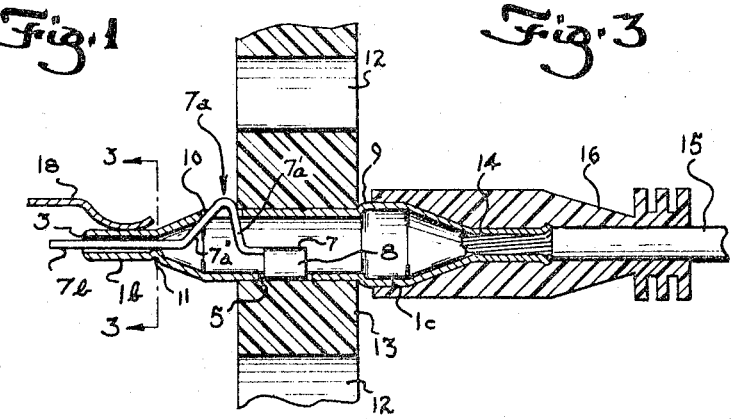
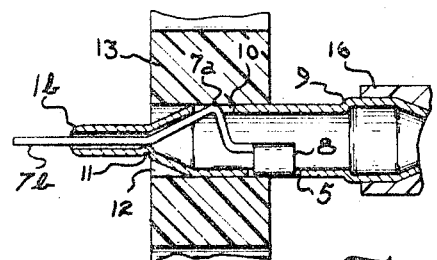
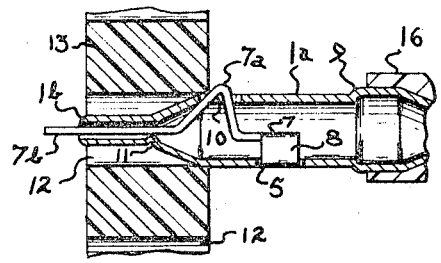
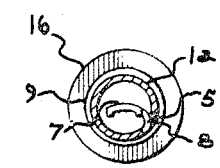
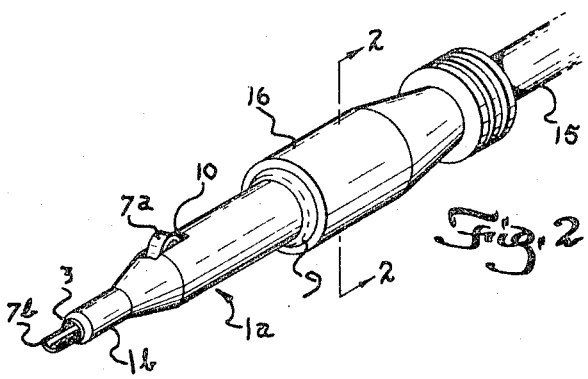
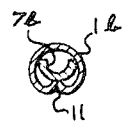
INVENTOR.
B. EDWARD SHLESINGER JR

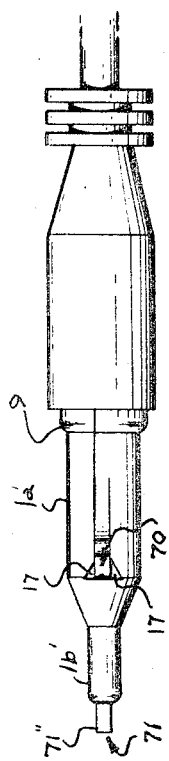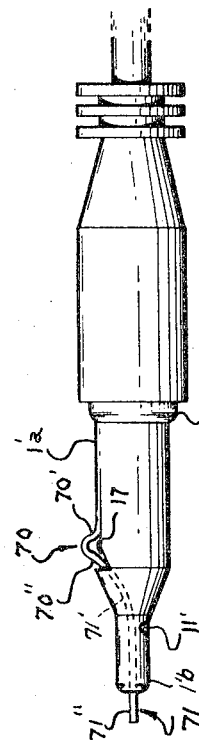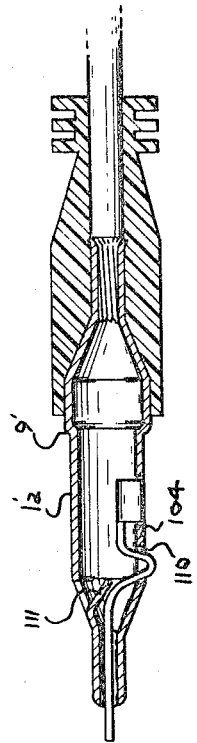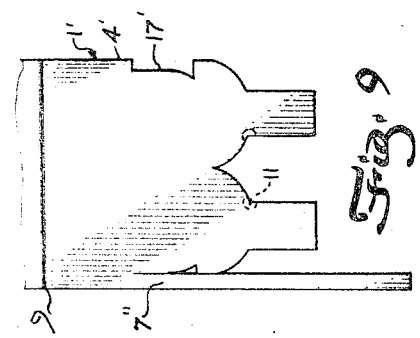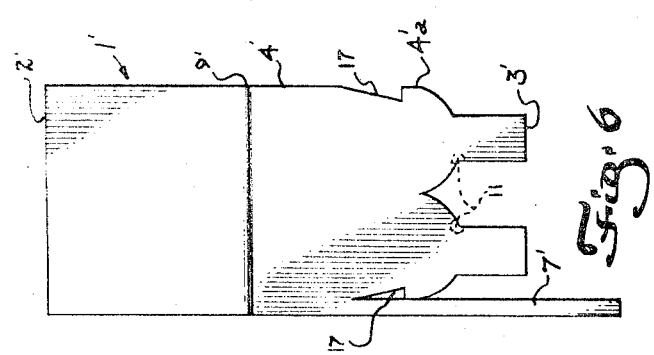

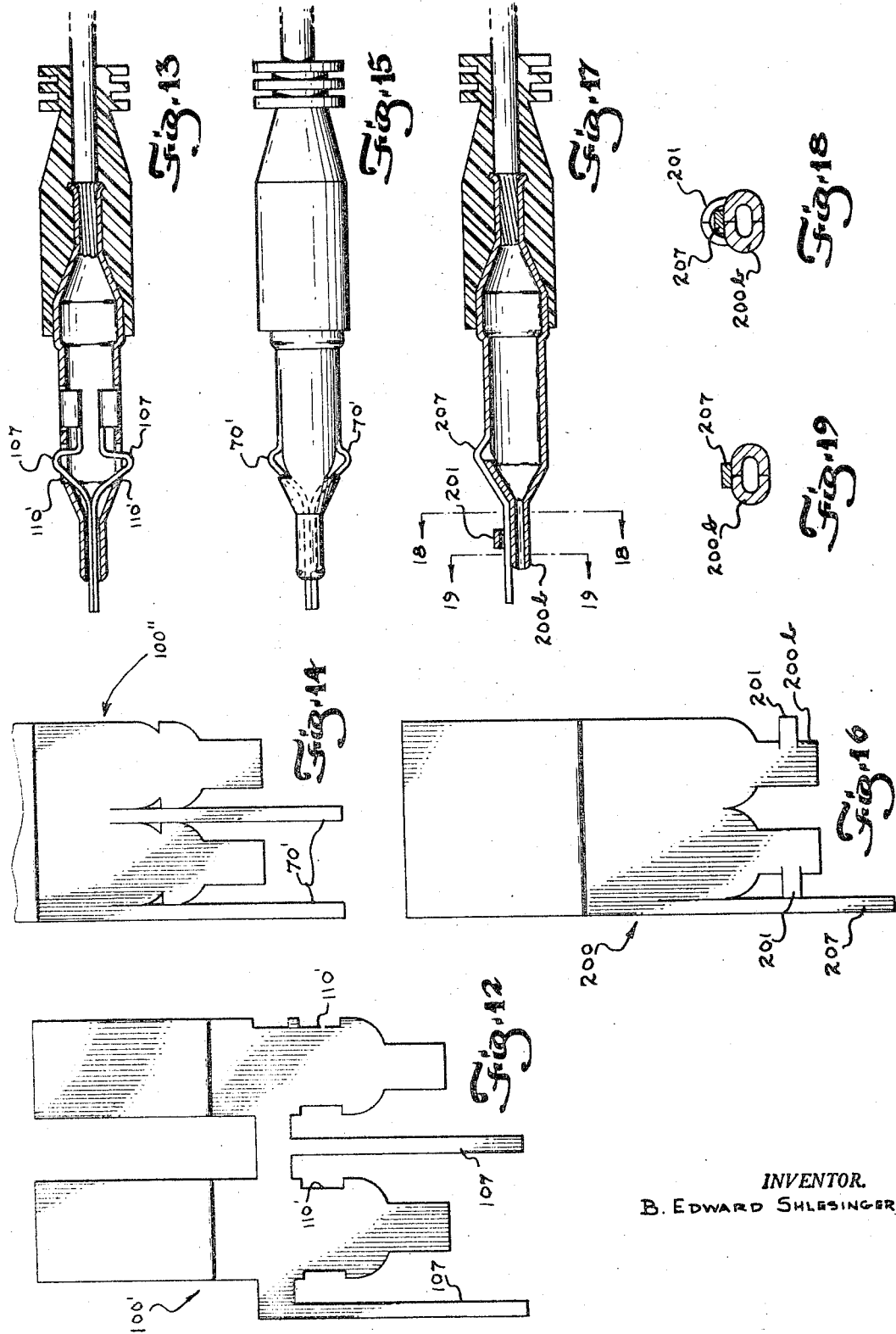

INVENTOR.
BERNARD EDWARD SHLESINGER, JR

United States Patent Office 3,445,930
Patented May 27, 1969

3,445,930
ONE-PIECE PLUGBOARD PLUG CONNECTOR
Bernard Edward Shlesinger, Jr., Annandale, Va., assignor to AMP Incorporated, Harrisburg, Pa.
Application July 26, 1965, Ser. No. 474,932, now Patent No. 3,275,973, dated Sept. 27, 1966, which is a continuation-in-part of application Ser. No. 321,125, Nov. 4, 1963. Divided and this application June 16, 1966, Ser. No. 558,043
Int. Cl. H02g 15/00
U.S. Cl. 29—629        20 Claims

ABSTRACT OF THE DISCLOSURE

A blank for a one-piece plug connector comprising a sheet metal piece of generally rectangular configuration including a body having front and rear end portions, and an intermediate portion; an elongated strip extending parallel to one side of the body and running from at least the intermediate portion toward the front portion and junctured behind the front portion; the front end portion including a strike-out means; the strike-out means being in advance of the juncture of the elongated strip, and the elongated strip extending forward of the front end portion.

---

This application is a division of application Ser. No. 474,932, filed July 26, 1965, now Patent No. 3,275,973, which in turn is a continuation-in-part of Ser. No. 321,125, filed Nov. 4, 1963, which is now abandoned.

This invention relates to electrical connector plugs, and more particularly to spring latch hand plugs that hold against pressure on the front portion but are readily withdrawn by a pull on the rear portion.

In present-day electrical equipment, it is common practice to employ connector panels or boards wherein connector plugs are inserted selectively in receptacles to connect and disconnect various control circuits. It is desirable that the plug be easily removable from the connector panel by a pull on the rear portion thereof, but not removable by a push on the front or tip portion of the contact member.

Heretofore, snap latch plugs have been provided with a detent system that includes a spring detent member and detent locking means that are complex, and generally include multiple parts which are expensive to manufacture and to incorporate in assembly in the plug body. If the number of parts has been reduced, there still has been the problem of providing a detent system which is capable of allowing the plug to be readily inserted and removed from a plug board, to maintain the plug securely in position, and to hold the plug in position upon a force being applied to the front or tip portion thereof.

One of the problems in connection with the detent system consisting of added spring parts is that the spring parts are made of material different from that of the shell portion of the plug, thereby requiring that the spring parts be manufactured separately from the shell portion. Another problem is the insertion of the spring-parts into the shell portion during manufacture of the plug. A further problem is the probability that the spring parts may extend too far above the shell portion until they form a permanent engagement which is undesirable.

A variety of forms of detent systems defining detent locking means for spring detent members have been heretofore proposed, some involving separate spring elements assembled in a plug shell and others including spring elements of a form difficult to manufacture and maintain to the uniform shape and close tolerances desired for uniform detention characteristics, as well as incidental elements thereof or connected thereto. Further, for tiny detent systems, the spring elements tend to break while being inserted during assembly resulting in time loss and additional cost of manufacture because of breakage discord. In actual use, the tiny springs now being manufactured, tend to fracture because of the sharp angular bends of the present designs, causing breakdown and malfunctioning of equipment when the plugs are accidentally pushed out of their receptacles.

It is, therefore, an object of the present invention to provide a one piece snap latch plug which is simpler and more economical in construction and which can be blanked from sheet material by a simple stamping operation.

It is another object of the present invention to avoid the use of added spring parts which are relatively costly in assembly and material, and generally require more force to be removed from a plugboard.

It is also an object of the present invention to provide a snap latch plug with a detent system which is rugged and will retain substantially its original characteristics over a long life.

An additional object of the present invention is to provide an effective arrangement to prevent the removal of the plug from a control panel upon force being applied to the front or tip portion thereof.

A still further object of the present invention is the provision of a detent system integral with the plug shell and of a character susceptible to precise control of shape.

Still a further object of the present invention is the provision of a detent system integral with the plug shell and having a nose portion surrounding the front section of the shell which is movable relative thereto.

Other objects and attainments of the present invention will become apparent to those skilled in the art upon a reading of the following detailed description when taken in conjunction with the drawings in which there is shown and described illustrative embodiments of the invention; it is to be understood, however, that this embodiment is not intended to be exhaustive nor limiting of the invention but is given for purposes of illustration in the invention and principles thereof and the manner of applying it in practical use so that they may modify it in various forms, each as may be best suited to the conditions of a particular use.

In the drawings:

FIGURE 1 is a plan view of the configuration of a piece of material for a plug connector prior to formation thereof;

FIGURE 2 is a perspective view of the plug connector after formation thereof from the material of FIGURE 1;

FIGURE 2a is a view taken on the lines 2—2 of FIGURE 2;

FIGURE 3 is a sectional view in elevation of the plug connector of FIGURE 2 in fully inserted position in an aperture of a plugboard;

FIGURE 3a is a view taken on the lines 3—3 of FIGURE 3;

FIGURES 4 and 5 are views similar to that of FIGURE 3, illustrating the plug at different stages of insertion in the plugboard aperture;

FIGURE 6 is a view similar to that of FIGURE 1, but of another embodiment;

FIGURES 7 and 8 are respectively a top plan view and side view of the plug connector after formation thereof from the material of FIGURE 6;

FIGURE 9 is a part plan view of another embodiment similar to that of FIGURE 6;

FIGURE 10 is a view similar to that of FIGURE 1 but of another embodiment;

FIGURE 11 is a cross-sectional view of the plug connector after formation thereof from the material of FIGURE 10;

FIGURES 12 and 13 are a plan view and a cross-sectional view respectively of a blank and formed plug connector similar to that of FIGURES 1–5;

FIGURES 14 and 15 are a plan view and a cross-sectional view respectively of a blank and formed plug connector similar to that of FIGURES 6–8;

FIGURES 16 and 17 are a plan view and a cross-sectional view respectively of a blank and formed plug connector of another embodiment of the present invention;

Figure 20:
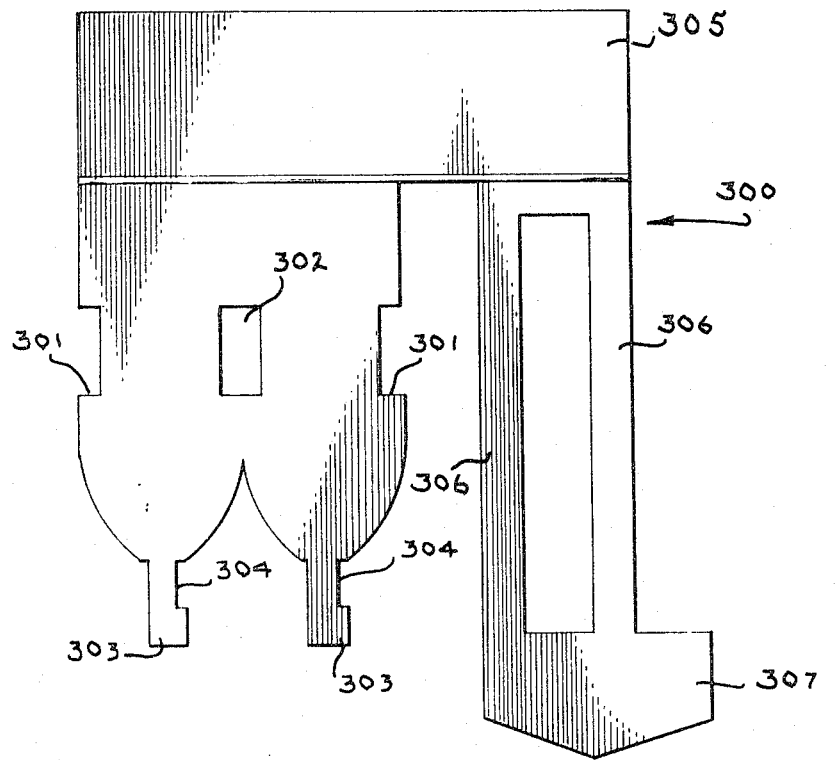
Figure 21:
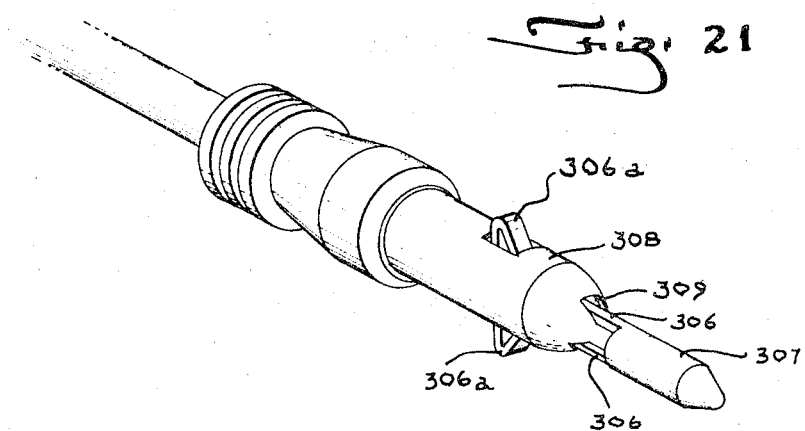
Figure 22:
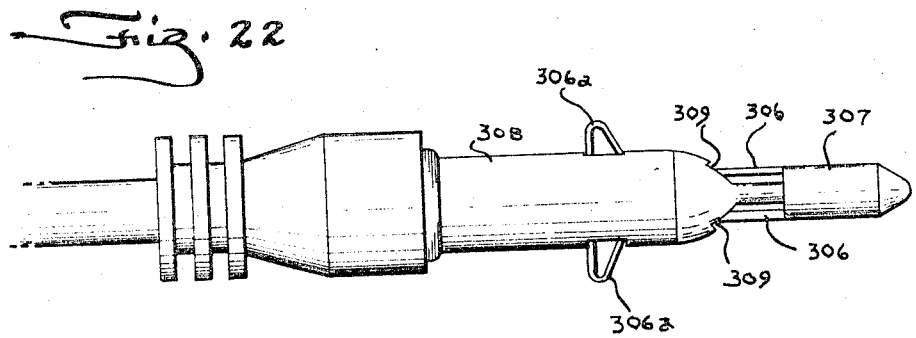
Figure 23:
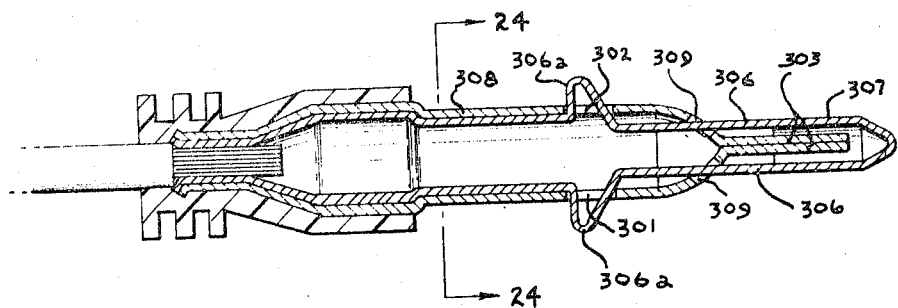

FIGURES 18 and 19 are views taken along the lines 18—18 and 19—19 respectively of FIGURE 17;

FIGURE 20 is a plan view of a blank for an additional embodiment of the present invention;

FIGURE 21 is a perspective view of a formed plug connector from the blank of FIGURE 20;

FIGURE 22 is a side elevational view of the plug of FIGURE 21;

FIGURE 23 is a longitudinal cross-sectional view of FIGURE 22; and

Figure 24:
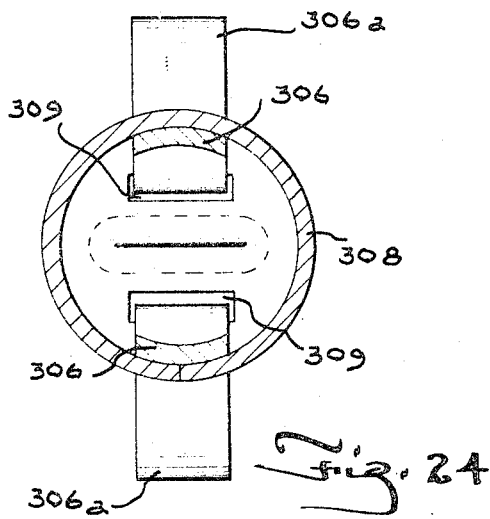

FIGURE 24 is an enlarged view taken along lines 24—24 of FIGURE 23.

Referring to the drawings, and in particular FIGURES 1–5, there is shown a blank of material 1 which has one end 2 that is planar, and the opposite end in the form generally of two arcs A having flattened central portions 3. One side 4 has a recess or rabbet 5 disposed therein, while the opposite side 6 has a tongue member 7 parallel therewith and integrally connected thereto by piece 8. Between end 2 and piece 8, a groove 9 is disposed therein. A rectangular slot 10 is disposed forwardly of the center of blank 1 toward end 3, and a dimpled area 11 is disposed forwardly of slot 10 along both sides 4 and 6.

Blank 1 is preferably made from a resilient conductive material, such as nickel-plated, full hard brass, but can be made from any other suitable material. Also, blank 1 is preferably stamped out from a sheet of brass, but certainly it can be obtained in any other suitable manner. Moreover, during the process of stamping out blank 1, it can also be formed into a tubular configuration through a progressive die machine conventional in the art.

Upon blank 1 being formed into a tubular configuration, as shown in FIGURES 2–5, there is provided a plug body comprising a shell portion 1a, a nose portion 1b, and a rear portion 1c; the latter portions having a smaller diameter than the shell portion. Flattened areas 3 when blank 1 is formed into tubular configuration will provide a nose 1b having a flat and smooth end surface. Tongue member 7 is formed into a detent system comprising a spring detent member 7a of arcuate configuration extending through slot 10 and above the surface of shell portion 1a, and a detent locking member 7b extending through and beyond nose portion 1b. A contact member 18 mounted in another panel (not shown) engages nose portion 1b to make electrical contact therebetween. Dimpled area 11 is disposed inwardly toward the longitudinal axis of the plug; detent locking member 7b engages dimpled area 11 to bias member 7b toward the longitudinal axis and to maintain a substantial portion thereof free of the inner surface of nose portion 1b in order to decrease the frictional engagement therebetween. Nose portion 1b also acts as a guide means for detent locking member 7b. The dimpled area 11 also serves to urge the tongue member 7 and the spring detent member 7a in an upwardly direction to project further out of slot 10 when pressure is brought on 7b as hereinafter explained.

The edges of tongue member 7 are preferably rounded in order to reduce the frictional engagement between this member and slot or strike out 10 and nose portion 1b. The outer bottom edge of nose portion 1b, forward of dimpled area 11, can be clinched inwardly toward the longitudinal axis in the same manner as dimpled area 11 in order that member 7 rides thereon, thereby providing only dimpled area 11 and this clinched portion of the bottom inner surface of nose portion 1b on which member 7 engages.

FIGURE 10 illustrates a blank 100 similar to that of FIGURE 1 except that the slot is formed by recesses 110 disposed in sides 104 and 106. With this arrangement, it is obvious that member 7 may extend through slot or rabbet or strike out 110 if formed on the same side as piece 8 as illustrated in FIGURE 11 when the plug has been formed which is opposite to that shown in FIGURE 3.

While there has been shown a dimpled area disposed in the plug body, it is obvious that other suitable means can be provided to maintain member 7b substantially free of nose portion 1b, such as, for example, a portion or strike out 111 cut in the shell portion inwardly toward the longitudinal axis of the plug, as shown in FIGURES 10 and 11.

As can be seen from FIGURE 3, the plug is mounted in an aperture 12 of plugboard 13, and the groove 9, which is now a circumferential ridge, acts as a limit means to limit the inward movement of the plug within the aperture.

The rear portion 1c includes a securing means 14 by which conductor means 15 is mechanically and electrically connected to the plug. Securing means 14 preferably comprises a ferrule member which is crimped around the wire means of conductor means 15 by cold-forging techniques conventional in the art, such as disclosed by U.S. Patent No. 2,600,012. Of course, any other means for securing the conductor means to the plug can be utilized.

An insulating sheath or sleeve 16 of suitable plastic material is disposed around the rear portion of the plug and adjacent insulation of conductor means 15 as by molding, or in any suitable manner such as by slipping sheath 16 onto conductor means 15 beyond the area of crimping to be applied to the securing means, and after the wire means has been crimped within the securing means the sheath is pushed onto rear portion 10 against ridge 9. Sheath 16 insulates the ferrule member or securing means 14, supports the conductor means contiguous the securing means, and provides a handle for manipulating the plug.

Turning once again to the spring detent member 7a, the rear portion 7'a thereof curves upwardly away from the longitudinal axis of the plug, whereas the front portion 7"a curves inwardly toward the longitudinal axis. It is recommended that the rear portion 7'a be of a sharper curve than portion 7"a. The reason for this is that pressure on 7b will tend to exert a more positive force thrusting 7a outwardly rather than inwardly. It will be obvious also that shifting the position of piece 8 forward will increase the latching action and vice versa. The top surface of the spring detent member is smoothly curved in a continuous manner in order to reduce the frictional resistance thereof during insertion of the plug into and removal of the plug from the board. In order to strengthen the spring detent member and the detent locking means, they can be shaped so as to have an arcuate cross-sectional configuration. Thus, the spring detent member so formed has excellent resilient properties which provide proper retention capability after extensive repeated use.

In order that the dimpled area 11 can operate effectively when detent locking means 7b has an arcuate cross-sectional configuration, it should have the convex portion thereof engaging dimpled area 11 instead of the concave portion, thereby resulting in part of tongue member 7 having an arcuate cross-sectional configuration in one direction and the other part having an arcuate cross-sectional configuration in the other direction (see FIGURE 3a).

FIGURES 6-8 show an embodiment similar to that of FIGURES 1-5. FIGURE 6 shows the blank 1' of material from which the plug of FIGURES 7 and 8 is to be formed. Side 4' and adjacent tongue member 7' have notches or strike out 17 disposed therein. The side of tongue member 7' adjacent the notch is sheared to about, or just beyond, the transverse plane through the center of blank 1'. The length of the cut will determine the extent of spring action of the member 7'. Side 4' also has a projection 4'a extending from the forward part of the notch 17 toward the forward part of the blank. Disposed in each of the arcs A having flattened ends 3' adjacent the interception therebetween is a dimpled area 11. Toward the end 2' is a ridge 9'.

The blank of FIGURE 6 is formed into the plug, illustrated in FIGURES 7 and 8, in a manner similar to the formation of the plug shown in FIGURES 2-5 as outlined above, but as can be discerned the spring detent member 70 is integrally anchored to the upper surface of shell portion 1'a and provides an upwardly curved portion 70' extending above the surface of shell portion 1'a and a downwardly curved portion 70'' extending within the opening formed by notches 17. This downwardly curved portion 70'' then forms detent locking means 71 which has a curved portion 71' engaging the inwardly formed dimpled area 11' and a projecting portion 71'' disposed within and beyond nose portion 1b'. The function of dimpled area 11' is the same as that of dimpled area 11 of FIGURES 1-5 and need not be further explained here.

While the upwardly curved portion 70' is shown as extending parallel to the surface of the shell portion 1b', the side 4' can be provided with a recess 17' (see FIGURE 9) so that when the plug is formed, the spring detent member is formed in the same manner as that of FIGURES 6-8 except that the portion of tongue member 7'' between the place where the spring detent member is integrally anchored to the shell portion and the upwardly curved portion 70' is bent inwardly within the recess 17' toward the longitudinal axis of the plug in order to provide additional resiliency to the spring detent member. Also, to lend strength to the spring detent member and detent locking means, they can be formed so as to have an arcuate cross-sectional configuration.

While only one spring detent member and one detent locking means has been disclosed, it is to be understood that more than one of these can be provided in each of the above-described plug connectors as illustrated by the blanks of FIGURES 12 and 14 and their assembled plugs illustrated respectively in FIGURES 13 and 15.

In FIGURE 12 there is shown two blanks 100' similar to that shown in FIGURE 10 and when the blanks are formed into a plug connector such as shown in FIGURE 13, two detent systems 107 extend outwardly from the body portion through slots 110' disposed diametrically therein and through the nose portion.

FIGURE 14 shows a double blank 100'' similar to that shown in FIGURE 6 and when the blanks are formed into a plug connector such as shown in FIGURE 15, two detent systems 70' are formed similar to that shown in FIGURES 7 and 8 and extend diametrically outwardly from the body portion of the plug connector in the same manner as that of the plug connector of FIGURE 13.

A further embodiment of the present invention is illustrated in FIGURES 16-19. A blank 200 to form the plug connector is shown in FIGURE 16 and is similar to that of FIGURE 6 except that nistead of forming notches in the sides, tabs 201 are provided. When the plug connector is formed from blank 200, as shown in FIGURE 17, nose portion 200b is in the shape of a circle back of where tabs 201 are connected to form a retaining and guiding means (see FIGURE 18). Forward of tabs 201, as shown in FIGURE 19, nose portion 200b is substantially flattened in order to provide sufficient area along which detent system 207 moves. As indicated, detent system 207 is similar to that of FIGURES 7 and 8, except that instead of passing through a slot to the interior of the plug connector and out an opening in the nose portion, detent system 207 is disposed within the retaining and guiding means formed by tabs 201 and engages the flattened area forward thereof and extends outwardly from the nose portion.

A still further embodiment of the invention is illustrated in FIGURES 20-24. A blank 300 to form the plug connector is shown in FIGURE 20 and is similar to that of FIGURE 1 except that notches 301 are provided in the sides in alignment with rectangular slot 302. Central portions 303 are not as wide as central portions 3 of blank 1 and a notch 304 is disposed in the right side thereof.

Extending outwardly from the right side via piece 305 and along the part of the blank to form the body portion are tongues 306 connected together at their outer ends by nose portion 307.

When the plug connector is formed from blank 300, as illustrated in FIGURE 21, nose portion 307 is in the shape of a cylinder with the outer end closed and conically shaped. As can be discerned, nose portion 307 surrounds the outer ends of central portions 303 which are interengaged to define a stabilizing member for the nose portion. Tongues 306 extend outwardly from body portion 308 through openings 309 that are formed from notches 304 and the sides of central portions 303 opposite notches 304. Tongues 306 also include detent sections 306a extending outwardly through rectangular slot 302 and a similar slot formed from notches 301.

As indicated, detent sections 306a are similar to those in FIGURE 13, except that instead of tongues 306 passing through slots to the interior of the plug connector and out an opening in the nose portion, the tongues extend outwardly from the body portion and form a nose portion surrounding engaging portions of the body portion which act as a stabilizing means for the nose portion. Instead of providing the nose portion with two tongues to form two detent sections, a single tongue could be provided between piece 305 and nose portion 307 and a single detent section would extend through slot 302, nose portion 307 would preferably still take the form illustrated in FIGURES 21-23. Nose portion 306, however, may take other desirable forms depending upon the circumstances.

The plug of FIGURES 7, 8, 11, 13, 15, 17, and 21 also has a conductor means secured in the rear portion thereof, as well as an insulating sheath in the same manner as that of FIGURES 2-5.

Each of the above plug connectors can also be used in a plugboard assembly, disclosed in U.S. Patent No. 2,927,295 to G. C. Sitz. Of course, the present invention can be used in any other suitable plugboard.

Operation

When the plug is inserted into an aperture 12 of plugboard 13, the portion 7''a of the spring detent member 7a is cammed inwardly toward the longitudinal axis of the plug by engagement with the outer opening of the aperture (see FIGURE 4). After the shell portion 1a has entered the aperture, the spring detent member is maintained inwardly, thereby during inward movement of the plug within the aperture as shown in FIGURE 5.

Upon complete insertion of the plug within the aperture, with ridge 9 in engagement with the outer surface of the plugboard, spring detent member 7a moves beyond the inner opening of the aperture as shown in FIGURE 3, i.e., portion 7'a engages the inner surface of the plugboard. In this position, spring detent member 7a provides a retentive force sufficient to maintain the plug within the aperture in spite of vibration effects and any other similar effects that would tend to normally cause the plug to work free of the plugboard.

If a force is applied to detent locking means 7b, as when a movable panel of a plugboard assembly, such as that disclosed in the above-mentioned Sitz patent, is carried to a position parallel to a stationary panel, detent locking means 7b is moved relative to the plug proper such that the spring detent member 7a is forced further beyond the inner opening of the aperture than the normal position thereof, thereby establishing a locking arrangement. Thus, the plug is locked in position so that it will not be pushed out of the aperture, and as a result a good connection is established beween the plug and contact member 18.

Of course, forces can be applied to the nose portion other than that mentioned above which will provide the same locking arrangement, and the plug can be used in plugboards other than the one used to explain the operation of the plug.

To remove the plug from the plugboard, a pull is exerted on sleeve 16 which causes the inner opening of the aperture to move the spring detent member inwardly through camming action until the spring detent member is within the aperture as shown in FIGURE 5. Upon complete removal of the plug, the spring detent member will assume its normal position. To facilitate insertion of the plug into the aperture, it can be slightly tapering from a small inner diameter to a slightly larger outer diameter.

While the operation has been only directed to the plug of FIGURES 1–5, it is obvious that the plug of FIGURES 6–19 operates in the same manner.

While the operation of the plug in FIGURES 20–24 is the same as the other plugs, the nose portion integrally connected to the detent sections operates detent sections to lock the plug in position in the plugboard whenever a force is applied thereto. This is different from the other embodiments, because the nose portions thereof are integral with the body portions thereof and are therefore stationary. The embodiment of FIGURES 20–24 presents a nose portion having more contact area and a rounded section to decrease wear between engaging contact members.

It can be discerned that there has been disclosed an electrical connector plug having a novel detent system, which is in one piece and is integral with the plug proper and, therefore, providing a long-sought need in the connector plug field; i.e., a plug fabricated from a single piece of material thereby obviating the addition of different parts during assembly of the plug, as well as the manufacture of these different parts.

It will therefore, be appreciated that the aforementioned and other desirable objects have been achieved; however, it should be emphasized that the particular embodiments of the invention, which are shown and described herein, are intended as merely illustrative and not as restrictive of the invention.

What is claimed is:
1. A blank for a one-piece plug connector comprising:
   (a) a sheet metal piece of generally rectangular configuration including a body having front and rear end portions, and an intermediate portion;
   (b) an elongated strip extending parallel to one side of said body and running from at least said intermediate portion toward said front portion and junctured behind said front portion;
   (c) said front end portion including a strike out means;
   (d) said strike out means in advance of the juncture of said elongated strip, and
   (e) said elongated strip extending forward of said front end portion.

2. A blank for a one-piece plug connector as in claim 1 and wherein:
   (a) said front portion includes a pair of spaced nose portions.
3. A blank for a one-piece plug connector as in claim 1 and wherein:
   (a) said juncture includes a spacing piece.
4. A blank for a one-piece connector as in claim 1 and wherein:
   (a) said strike out means includes a pair of spaced cut-outs.
5. A blank for a one-piece connector as in claim 4 and wherein:
   (a) said spaced cut-outs are on opposite sides of said blank.
6. A blank for a one-piece connector as in claim 1 and wherein:
   (a) said strike out means includes an opening in said blank.
7. A blank for a one-piece connector as in claim 1 and wherein:
   (a) said strike out means includes a rabbet in said blank.
8. A blank for a one-piece connector as in claim 1 and wherein:
   (a) said blank includes a rabbet for said elongated strip.
9. A blank for a one-piece connector as in claim 1 and including:
   (a) a second elongated strip parallel to said first mentioned strip.
10. A blank for a one-piece connector as in claim 1 and wherein:
    (a) said body is formed of two halves interconnected by a connecting leg.
11. A blank for a one-piece connector as in claim 2 and wherein:
    (a) said spaced nose portions include a tab.
12. A blank for a one-piece connector as in claim 9 and wherein:
    (a) said elongated strips include a nose portion.
13. A blank for a one-piece connector as in claim 12 and wherein:
    (a) said nose portion connects said strips.
14. A blank for a one-piece connector as in claim 13 and wherein:
    (a) said strips and said nose portion form an opening in said blank.
15. A blank for a one-piece plug connector as in claim 1 and wherein:
    (a) said front end portion includes a pair of nose portions each having a pair of arcuately curved sides.
16. A blank for a one-piece plug connector as in claim 1 and wherein:
    (a) said front end portion includes at least a pair of oppositely curved arcuate portions.
17. A blank for a one-piece plug connector as in claim 16 and wherein:
    (a) said front end portion includes recesses disposed contiguous to said curved arcuate portions.
18. A blank for a one-piece plug connector as in claim 16 and wherein:
    (a) said front end portion includes at least one nose portion projecting forwardly of said curved portions.
19. The method of making a one-piece plug connector comprising:
    (a) cutting in a sheet of conductive material a blank having front, rear and intermediate portions and including an elongated strip extending parallel to one side of said body and running from at least said intermediate portion toward said front portion and junctured behind said front portion, and said front end portion including strike-out means in advance of the juncture of said elongated strip, and said elongated strip extending forward of said front end portion;

(b) forming said elongated strip into a spring detent system having a detent and tip portion; and (c) forming said blank about said spring detent system and into a tube having a front end whereby said detent cooperates with an opening formed in said tube by said strike-out means to project outwardly from the surface of said tube and said tip portion projects outwardly through said front end of said tube.

20. The method of making a one-piece plug connector as in claim 19 and including:

(a) forming said elongated strip with a curved cross-sectional configuration to give strength thereto.

References Cited

UNITED STATES PATENTS

| | | | |
|---|---|---|---|
| 2,330,948 | 10/1943 | Brand et al. | 339—217.3 |
| 2,691,771 | 10/1954 | Burtt et al. | 339—217.3 |
| 2,779,007 | 1/1957 | Cunningham | 339—217.3 X |

JOHN F. CAMPBELL, *Primary Examiner.*

D. C. REILEY, *Assistant Examiner.*

U.S. Cl. X.R.

29—190; 339—217.3